United States Patent [19]
Harris et al.

[11] 3,955,951
[45] May 11, 1976

[54] REPAIRING CLOGGED ORIFICES IN FIBERIZING BUSHINGS

[75] Inventors: Walter William Harris, Toledo; David Jon Pickard, Waterville, both of Ohio

[73] Assignee: Johns-Manville Corporation, Denver, Colo.

[22] Filed: June 2, 1975

[21] Appl. No.: 582,574

[52] U.S. Cl. ............................................ 65/1; 65/2; 65/28; 65/171; 65/172
[51] Int. Cl.² .................................... C03B 37/02
[58] Field of Search ................ 65/1, 2, 11 W, 11 R, 65/28, 171, 172

[56] References Cited
UNITED STATES PATENTS

| | | | |
|---|---|---|---|
| 2,996,758 | 8/1961 | McFadden | 65/1 |
| 3,350,182 | 10/1967 | Hunter et al. | 65/1 |
| 3,551,234 | 12/1970 | Britton | 65/28 X |
| 3,607,164 | 9/1971 | Thom et al. | 65/1 |

*Primary Examiner*—Robert L. Lindsay, Jr.
*Attorney, Agent, or Firm*—Robert M. Krone; Joseph J. Kelly; John H. Miller

[57] ABSTRACT

Continuous inorganic fibers such as glass fibers are made by drawing molten material from orifices in the bottom of a refractory bushing. Occasionally during operation one or more tips will become clogged by unmelted particles in the molten material. These clogged tips will no longer produce a continuous fiber, but instead drip causing defects and breakouts which must be corrected. In the past, several methods have been tried to plug off these clogged tips, but none have been successful. The present invention involves a method of plugging a clogged tip while the bushing is at an elevated temperature using a small refractory plug. The present invention permits the bushing to be operated for its normal life thus producing a significant improvement in operating costs.

13 Claims, 4 Drawing Figures

U.S. Patent May 11, 1976 3,955,951
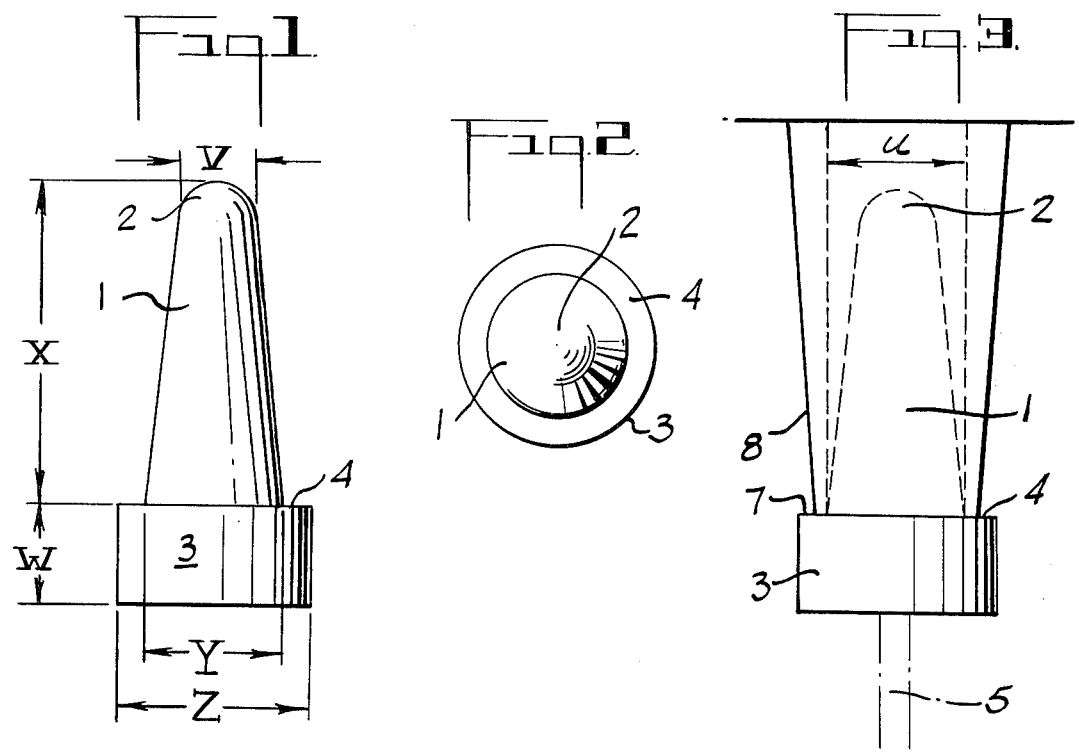
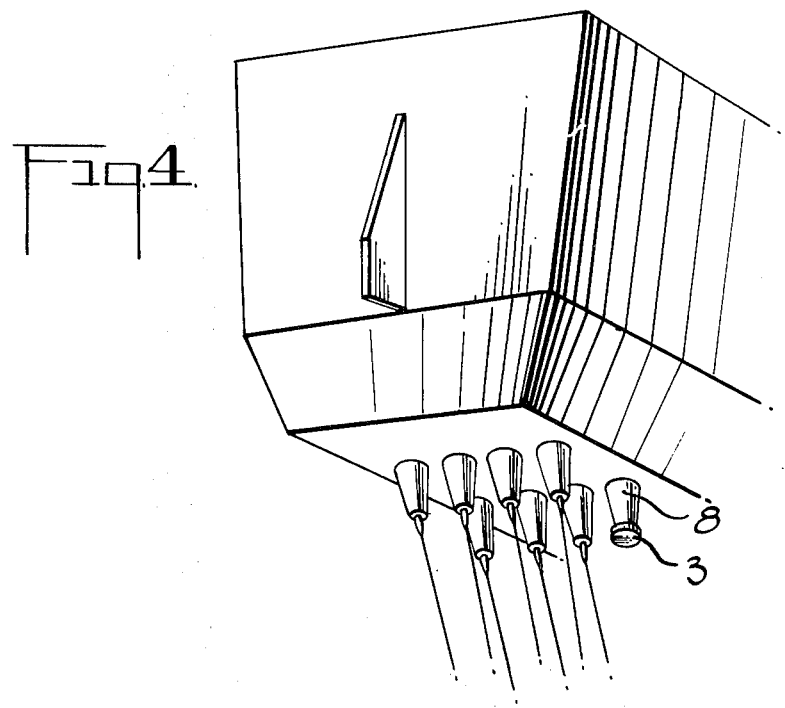

REPAIRING CLOGGED ORIFICES IN FIBERIZING BUSHINGS

The present invention involves the old process of making inorganic fibers such as glass fibers by exuding molten inorganic material through small orifices in a refractory bushing. The present invention is an improvement in that process and the apparatus used therewith.

BACKGROUND OF THE INVENTION

It is common practice to make inorganic fibers, such as glass fibers, by either feeding molten glass, or glass in another form such as marbles, to a refractory bushing that is maintained at a temperature above the melting point of the inorganic material in a conventional manner. The molten inorganic material is then exuded from small orifices in the bushing to form continuous fibers. The fibers can be drawn out and are then cooled below their softening point very quickly after leaving the orifices. Glass fibers made in this manner are used to make textiles and as reinforcement for plastics in the manufacture of a variety of items such as boats, car bodies, etc.

The bushings used in these processes must be refractory because of the high temperatures involved and usually are made of a noble metal such as platinum or an alloy thereof, e.g. platinum-rhodium, platinum-palladium, etc. Normally the bottom of the bushing contains many orifices, for example, 500 to several thousand, in a small area. The refractoriness of these bushings and the precise way in which they must be made make the bushings very expensive.

Normally a bushing lasts from 4 to 8 months of continuous operation. However, occasionally a tip will become clogged with one or more particles sluffed off of the melting furnce walls, from unmelted batch, stones, or other sources. A clogged tip usually is clogged to the extent that it will no longer produce a continuous fiber, but instead drips and these drips cause breakouts which interrupt the process. Heretofore several methods have been tried to clear out the clogged tips or to close them off. These include: (1) increasing the bushing orifice section temperature to melt or boil out the obstruction, (2) heating the exterior of the obstructed tip with a torch or other means to melt out the obstruction, (3) probing up into the orifice with a small rod or wire to clear the obstruction, and (4) pinching the tip to close the orifice. None of these techniques have worked successfully. Instead it has been necessary to remove the bushing, sometimes after only a few hours of service, and replace it with a new bushing. Once the bushing is removed is must be cleaned, usually by leeching with acid to remove the solidified glass therein, and melted down for use in making new bushings. Thus, the problem of clogged tips is an expensive problem that has plagued industry for a long time.

SUMMARY OF THE INVENTION

A technique has now been discovered for permanently sealing off a clogged orifice thus permitting the bushing to remain in service for its normal life. The technique of the present invention involves inserting a refractory plug, having a first tapered portion and a second base portion and particular dimensions with respect to the orifice diameter, into the obstructed orifice while the orifice is at an elevated temperature. The present invention also includes a bushing having one or more of its orifices plugged with the aforementioned plugs.

BRIEF DESCRIPTION OF THE DRAWINGS

FIG. 1 is an elevational view of the plug used in the present invention. FIG. 2 is a top view of the plug shown in FIG. 1.

FIG. 3 is a partial perspective view of a conventional bushing with a plug inserted into one of the orifices according to the present invention.

FIG. 4 is an enlarged view of the tip shown in FIG. 3 having the plug inserted therein.

DETAILED DESCRIPTION AND PREFERRED EMBODIMENTS

Referring to FIGS. 1 and 2, the plug used in the present invention comprises a first tapered portion 1 and a second base portion 3 that extends beyond the tapered portion to form a flange or seat 4. A wire or rod 5 (FIG. 3) can be welded onto the base portion for purposes of grasping the plug, but this latter feature is optional since the plug can be grasp by the base portion 3. The plug illustrated in FIG. 2 has a round base portion 3, but the peripheral shape of the base portion is not critical except that it should not project laterally any more than necessary. Since the tips in a typical bushing are very close together, if the base portion 3 projects too far laterally, it will interfere with fibers emitted from adjacent tips.

The dimensions of the plug with respect to the orifice diameter in the tip to be plugged are critical. Dimension V must be smaller than the diameter of the orifice (dimension U in FIG. 3) and if that limitation is present the actual shape of the tip 2 of the plug is not critical. Dimension X is not critical, but it is preferred that it be sufficient with respect to the Dimensions Y and V to produce a gradual taper. In the preferred embodiment disclosed here a length of 0.21 inches is a suitable X dimension. The Y dimension is critical and should be slightly larger than the diameter of the orifice. If Y is too large, insertion of the plug will split the tip and cause an additional leak, and if Y is too small it will not produce a press fit necessary to the present invention. It is preferred that the Y dimension be about 0.01 inches greater than the orifice diameter of the clogged tip. The W dimension is not critical, but should be sufficient that it is not easily deformed downwardly when the plug is inserted completely into the clogged tip and thus maintaining a planer seat 4. In the preferred embodiment a W dimension of about 0.07 inches is suitable. The Z dimension must be greater than the Y dimension to form the seat 4 and sufficiently small that it does not interfere with fiberizing operation in the adjacent tip. In the preferred embodiments the Z dimension typically ranges between about 0.015 to about 0.025 inches more than the orifice diameter in the clogged tip.

It is preferred to use the same refractory metal used in the bushing to make the plug used in the present invention so that the plug does not contaminate the bushing material when the bushing is melted down after its useful life. However, other refractory materials compatible with the bushing material could be tested to determine their suitability very easily.

When a clogged tip is observed, the bushing temperature is reduced to slightly below the dripping temperature. Referring to FIGS. 3 and 4, the plug is gripped by the wire 5 or the base 3 with a suitable tool such as a pair of long needle nose pliers, and pushed up into a clogged orifice, having diameter U, from beneath the bushing until the seat 4 is snug against the base 7 of a tip 8. Specially made pliers having a grip end to match the plug end would be advantageous. After the plug is pushed up into the clogged orifice until the flange 4 seats against the lower portion 7 of the orifice tip 8, it may be advantageous to rotate the plug slightly while pushing upward to form a better seat. On a bushing that merely has orifices drilled in a bottom plate 9 and having no orifice tips, the base portion 3 should seat snugly against the exterior of the bottom plate.

Once the plug is inserted the bushing is brought back to operating temperature and the fiberizing is again begun in a conventional manner (see FIG. 4). This procedure is repeated whenever a clogged orifice tip is observed.

When a cold plug is inserted into a hot bushing, for example at a temperature of about 1800°F, the plug expands upon being heated by the hot bushing to form a press fit which permanently seals off the clogged orifice tip. Although it has not been proven, it is believed that the plug actually welds itself to the tip at the contact line since tests with platinum/rhodium alloy thermocouples in an annealing furnace have shown such welding at 1800°-2000°F under slight pressure.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by the claims appended hereto.

We claim:

1. In a process of making inorganic fibers by exuding molten inorganic material through orifices in a refractory bushing, the improvement comprising:
observing said bushing to detect a clogged orifice and when a clogged orifice is detected, inserting into said clogged orifice while said bushing is at an elevated temperature a plug to seal off said clogged orifice, said plug comprising a first tapered portion and a second base portion, said first portion having a tip opposite said base portion whose diameter is smaller than the diameter of the clogged orifice and a portion adjacent said base portion whose diameter Y is sufficiently greater than the diameter of said clogged orifice to produce a pressure fit without cracking or splitting the metal in the bushing surrounding said orifice, and the base portion having a diameter Z that is greater than Y to provide a seat for limiting the amount that the tip portion is inserted into the clogged orifice.

2. A process as defined in claim 1 wherein Y is about 0.01 inches greater than the diameter of the clogged orifice.

3. A process as defined in claim 1 wherein the base portion has a thickness W which is sufficient to resist deflection when the plug is inserted sufficiently to seat the top of the base portion against the bottom of the orifice.

4. A process as defined in claim 3 wherein the greatest width dimension of the base portion is within the range of about 0.015 to about 0.025 inches greater than the orifice diameter.

5. A process as defined in claim 1 wherein the plug comprises essentially the same composition as the metal surrounding the orifice being plugged.

6. A process as defined in claim 1 wherein said elevated temperature is just below the dripping temperature of the bushing and the inorganic material being fiberized.

7. The process as defined in claim 1 wherein the plug is rotated after complete insertion to form a better seat between the base portion and the bottom of the orifice.

8. A refractory bushing for fiberizing molten inorganic material through a plurality of orifices in said bushing, the improvement comprising:
one or more of said orifices being plugged by a plug comprising a first tapered portion and a second base portion, said first portion having a tip opposite said base portion whose diameter is smaller than the diameter of the clogged orifice and a portion adjacent said base portion whose diameter Y is sufficiently greater than the diameter of said clogged orifice to produce a pressure fit without cracking or splitting the metal in the bushing surrounding said orifice, and the base portion having a diameter Z that is greater than Y to provide a seat for limiting the amount that the tip portion is inserted into the clogged orifice.

9. A bushing as defined in claim 8 wherein Y is about 0.01 inches greater than the diameter of the clogged orifice.

10. A bushing as defined in claim 8 wherein the base portion has a thickness W which is sufficient to resist deflection when the plug is inserted sufficiently to seat the top of the base portion against the bottom of the orifice.

11. A bushing as defined in claim 10 wherein the greatest width dimension of the base portion is within the range of about 0.015 to about 0.025 inches greater than the orifice diameter.

12. A bushing as defined in claim 8 wherein the plug comprises essentially the composition as the metal surrounding the orifice being plugged.

13. A bushing as defined in claim 11 wherein the base portion of the plug is cylindrical.

* * * * *